May 27, 1941.                D. H. CLEWELL                2,243,750
                              GRAVITY METER
                           Filed March 6, 1940
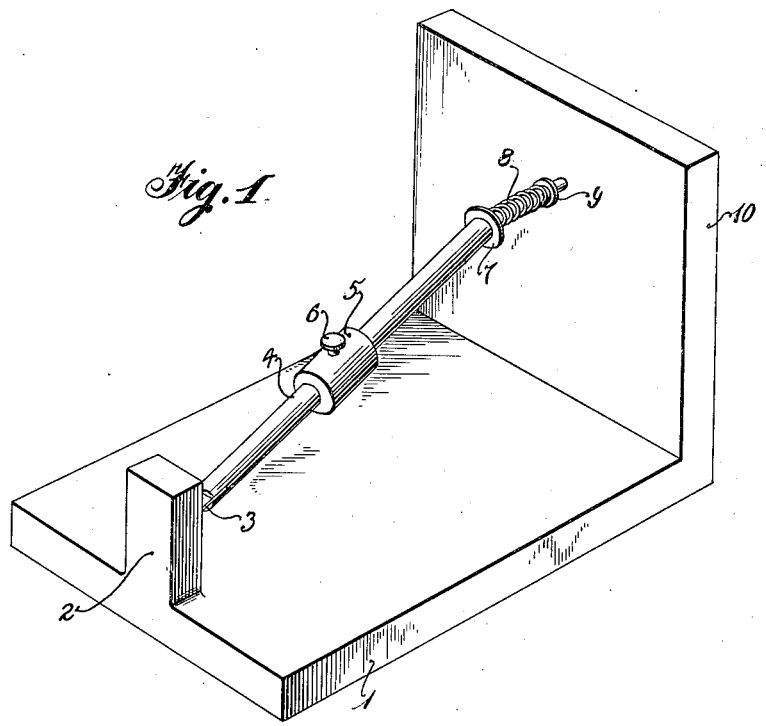
Inventor
*Dayton H. Clewell*
By
*Myron J. Burkhard*
Attorney Patented May 27, 1941

2,243,750

UNITED STATES PATENT OFFICE 2,243,750

GRAVITY METER

Dayton H. Clewell, Dallas, Tex., assignor, by mesne assignments, to Socony-Vacuum Oil Company, Incorporated, New York, N. Y., a corporation of New York Application March 6, 1940, Serial No. 322,495

5 Claims. (Cl. 265—1.4)

This invention relates to a device for measuring the relative gravitational attraction of the earth at various locations and particularly to a gravity meter for use in connection with geophysical prospecting.

It has long been known that small differences in the gravitational attraction of the earth exist at different locations and that these differences are indicative of the nature of the subsurface strata at the locations. Much work has been done in devising various types of instruments for measuring these extremely small differences in the force of gravity and in correlating the differences so determined with the known differences in the subsurface strata. This work has shown that information as to relative gravitational attraction at various locations being prospected has definite value to the survey but the means for obtaining it have not been all that might be desired.

The problem involved is one of constructing an extremely sensitive gravity meter that can be readily and easily calibrated and adjusted to a base or zero reading and can then be transported into the field, set up and operated under field conditions without any great loss of sensitivity, disturbance of the calibration or other injury to the instrument. The present invention has for its principal purpose the provision of such an instrument. One of the disadvantages of instruments of this character heretofore known to the art is that they are exceedingly sensitive to variations in level, while it is an object of the present invention to provide an instrument of this character which is relatively insensitive to level. It will be readily recognized that the operation of a gravity meter relatively insensitive to level will be enormously simplified under field conditions.

According to this invention a mass is supported between a leaf spring and a coil spring in such a manner that neither the leaf nor the coil spring is under sufficient strain to cause it to become fatigued and suffer a permanent distortion that would disturb the calibration or the sensitivity of the instrument. At the same time the suspension is such as to hold the mass in a state of very delicate balance so that a relatively small change in gravitational attraction will produce a relatively large change in the position of the mass.

All this is accomplished by supporting the mass through the leaf spring which acts both as a spring to hold the mass in position and as a fulcrum about which the mass moves and then placing the coil spring in such a position that it resists any downward movement of the mass, not directly, but obliquely, so that a downward movement of the mass produces a relatively small compression in the coil spring. By properly adjusting the compression on the coil spring and the position of the mass between the coil spring and the leaf spring it has been found that a balance can be established where the leaf spring is under no great bending stress and the coil spring is subjected to little enough stress so that it is in no danger of suffering permanent distortion, and yet the balance is so sensitive that the slightest change in gravitational attraction causes the mass to move to a very considerable extent.

In order to obtain a more complete understanding of the principles of this invention and of the particular embodiment which has been found especially desirable consideration should be given to the following detailed description of one preferred embodiment of this invention and the drawing which illustrates it in which:

Figure 1 is a perspective view of a preferred embodiment of the new gravity meter; and Figure 2 is a diagram produced for the purpose of explaining the effect of the several factors which combined form the physical characteristics of the new gravity meter.

As illustrated in the drawing the new gravity meter includes a U-shaped frame member 1 in one leg 2 of which is mounted a leaf spring 3 which extends upwardly at an acute angle to the horizontal from the inside of the leg. On the upper end of this leaf spring is fixed a supporting rod 4 which carries slidably upon it the main mass 5 of the device. A set screw 6 in the main mass holds the mass in any desired position on the rod. At the upper end of the rod which also extends upwardly at an acute angle to the horizontal, in continuation of the line of the leaf spring, is a cup 7 which is adapted to receive one end of a coil spring 8 the other end of which bears against the adjusting screw 9 which is threaded through the opposite leg 10 of the U-shaped member to that in which the leaf spring is mounted.

In operation the gravity meter illustrated is adjusted at the base station by movement of the mass along supporting rod 4. Finer adjustments are effected by movement of adjusting screw 9 to vary the compression on coil spring 8. The position in which the mass comes to rest is then ascertained through whatever optical system is provided for that purpose and the device is then ready for use. Deflections of the mass 5 are quite large for relatively small changes in the gravitational attraction of the earth and the instrument will remain without appreciable drift for long periods of time.

Recent field practice has shown that the simple pivoted horizontal beam gravity meter has many characteristics that make is valuable as a rapid gravity survey instrument.

It is capable of being adjusted to very low level sensitivities so that no great care must be exercised in setting the meter up on a station. This characteristic is a direct result of the beam being substantially horizontal in its normal working position or makes as small an acute angle with the horizontal as is practical; i. e., the center of gravity of the beam is in substantially the same horizontal plane as its pivot point.

This type of instrument is also relatively insensitive to stray forces that may be applied to the beam from any direction. As a contrasting example the bifilar pendulum is usually fifty times more sensitive to certain horizontal forces than it is to the vertical force of gravity which is to be measured.

Referring now to Figure 2, a beam whose center of gravity is a distance ($r$) from the axis of rotation is rotatable in a vertical plane which intersects the true level surface in the line PQ. The line MN is in this same vertical plane and is a reference line fixed to the frame of the instrument. Since the beam is to be operated in a nearly horizontal position, or when the beam makes as small an acute angle with the horizontal as is practical, it makes a small angle $\theta$ with MN and a small angle $\omega$ with the true level surface. The angle between PQ and MN is the orientation of the instrument frame relative to the earth's gravitational field and will be designated $\beta$. The angle $\beta$ is reproduced at each gravity station by means of levels attached to the instrument framework.

The gravity moment of the beam is obviously $mgr \cos \omega$ and is neutralized in some way by elastic torques applied to the beam. The elastic torques are obviously functions of $\theta$ rather than $\omega$, since these torques depend on the orientation of the beam with respect to the instrument frame. For this general discussion the spring 8 of Figure 1 is designated in Figure 2 as an arrow representative of the vertical component of the force exerted on the mass by said spring. All that is required for the present is to know that $\tau$ is some function of $\theta$.

For equilibrium of the pivoted beam to exist the elastic torque must equal the gravity moment or I $\quad\quad\quad \tau = mgr \cos \omega$ or since from Figure 1 $\omega = \theta + \beta$ we can write $$\tau = mgr \cos (\theta + \beta)$$

This equation is a relation, then, that describes the angular position ($\theta$) of the beam in terms of the value of gravity ($g$).

We must, however, go one step further and determine what proportions must be used in constructing the instrument to insure that a very small change in gravity will alter the angle of the beam by a sufficient amount that it can be detected by practical means.

The gravity sensitivity ($c$) can be defined as the ratio of the beam deflection ($d\theta$) to the fractional change in gravity producing the deflection or II $\quad\quad c = \dfrac{d\theta}{dg/g}$ or $d\theta = c \dfrac{dg}{g}$ To evaluate ($c$) we must differentiate the equilibrium Equation I, considering only $\theta$ and $g$ as variable. We then have, remembering that $\tau$ is a function of $\theta$ $$\left(\frac{\partial \tau}{\partial \theta}\right)\frac{d\theta}{dg} = \frac{mgr \cos (\theta + \beta)}{g} - mgr \sin (\theta + \beta)\frac{d\theta}{dg}$$

Rearranging terms this equation becomes $$\left[\frac{\partial \tau}{\partial \theta} + mgr \sin (\theta + \beta)\right] d\theta = mgr \cos (\theta + \beta) \frac{dg}{g}$$

$$d\theta = \frac{mgr \cos (\theta + \beta)}{\frac{\partial \tau}{\partial \theta} + mgr \sin (\theta + \beta)} \cdot \frac{dg}{g}$$

which when compared to Equation II shows that

III $\quad\quad c = \dfrac{mgr \cos (\theta + \beta)}{\dfrac{\partial \tau}{\partial \theta} + mgr \sin (\theta + \beta)}$ Equation III is very general and is applicable to any pivoted beam using any type of elastic members to support the beam. The inverted pendulum gravity meter of Ising and Lejay-Halweck are examples as well as the Mott-Smith, Hartley and Truman gravity meters. These various instruments all differ in the specific form of the function $\tau$, determined by the type of elastic member and method of attachment to the beam that is used.

For practical purposes it is necessary that a gravity meter given a measurable response to changes in gravity of the order of one part in ten million; i. e., the smallest detectable value of $$\frac{dg}{g}$$

is $10^{-7}$. To obtain this condition the sensitivity ($c$) is usually of the order of 20 to 100 if optical means are used in observing the deflection of the beam. These high values are the result of so proportioning the dimensions of the beam and elastic members that the denominator of Equation III approaches a quantity considerably smaller than the numerator. The limit of this process occurs when the denominator becomes zero (or)

IV $\quad\quad \dfrac{\partial \tau}{\partial \theta} = -mgr \sin (\theta + \beta)$ At this point infinite sensitivity or instability sets in. This process of securing high sensitivity has been described in various ways in the prior art; labilizing, astatization, and inducing a "long period of oscillation" are common terms used in the literature.

We note finally that $\tau$ controls the position of the beam while $$\frac{\partial \tau}{\partial \theta}$$

controls the sensitivity.

In any gravity measuring instrument that is used in rapid survey work it is important that the "level sensitivity" be a minimum; i. e., relatively large errors in levelling should not produce spurious deflections of the beam. In Figure 2 it is noted that the angle $\beta$ represents the orientation of the instrument frame with the true horizontal surface. It is required, then, that levelling errors induce as small beam deflections $d\theta$ as possible or $$\frac{d\theta}{d\beta} \to 0$$

If in Equation I we now let $\theta$ and $\beta$ be the variables we have upon differentiation that $$\left(\frac{\partial \tau}{\partial \theta}\right)\frac{d\theta}{d\beta} = -\mathrm{mgr}\, \sin\,(\theta+\beta)\left[1+\frac{d\theta}{d\beta}\right]$$

Solving for $$\frac{d\theta}{d\beta}$$

we have $$\frac{d\theta}{d\beta} = -\frac{\mathrm{mgr}\, \sin\,(\theta+\beta)}{\frac{\partial \tau}{\partial \theta}+\mathrm{mgr}\, \sin\,(\theta+\beta)}$$

But since the denominator is equal to $$\frac{\mathrm{mgr}\, \cos\,(\theta+\beta)}{c}$$

V $$\frac{d\theta}{d\beta} = -c\, \tan\,(\theta+\beta)$$

which approaches zero when $\theta+\beta=0$.

This means that minimum sensitivity to level occurs when the normal operating range of the beam is such that its center of gravity is in substantially the same horizontal surface as the axis of rotation of the beam. It is immediately understandable why the inverted pendulums have such a high level sensitivity for they usually have the pendulum at a considerable angle above the horizontal.

It has been shown that a condition of instability will occur when $$\frac{\partial \tau}{\partial \theta} = -\mathrm{mgr}\, \sin\,(\theta+\beta)$$

It is usually found that in an instrument of high gravity sensitivity this point of instability occurs for a particular value of the beam angle $\theta$ not very far removed from the normal operating range. To insure stability of the suspension it is naturally advantageous to so proportion the dimensions of the beam and elastic members that at the necessary gravity sensitivity the point of instability is still as far removed from the normal operating range as possible.

Since the gravity sensitivity is infinite at the point of instability it can be shown that as the beam approaches this point the sensitivity will increase more and more rapidly, and vice-versa the sensitivity becomes more and more constant (linear) as the angle of the beam recedes from the critical value. Thus the linearity or constancy of sensitivity over the operating range of the beam is a criterion of the stability.

It is also convenient to have as much linearity as possible to facilitate conversion of the beam deflections into gravity changes. In other words, the beam deflections should be directly proportional to the gravity changes.

The question of constant sensitivity is answered by examining $$\frac{dc}{d\theta}$$

the rate of change of the sensitivity with the angular movement of the beam. Linearity will increase as $$\frac{dc}{d\theta}$$

decreases.

If we differentiate Equation III with respect to $\theta$ we have $$\frac{dc}{d\theta} = -\frac{\mathrm{mgr}\, \sin\,(\theta+\beta)}{\frac{\partial \tau}{\partial \theta}+\mathrm{mgr}\, \sin\,(\theta+\beta)} - \frac{\mathrm{mgr}\, \cos\,(\theta+\beta)\left[\frac{\partial^2 \tau}{\partial \theta^2}+\mathrm{mgr}\, \cos\,(\theta+\beta)\right]}{\left[\frac{\partial \tau}{\partial \theta}+\mathrm{mgr}\, \sin\,(\theta+\beta)\right]^2}$$

in which $c$ can be substituted to give $$\frac{dc}{d\theta} = -c^2\left[\frac{\tan\,(\theta+\beta)}{c}+1+\frac{1}{\mathrm{mgr}\, \cos\,(\theta+\beta)}\frac{\partial^2 \tau}{\partial \theta^2}\right]$$

This equation proves first of all the above statement that rate of change of sensitivity increases more and more rapidly as the sensitivity itself increases since $$\frac{dc}{d\theta}$$

contains $c^2$ as a factor, except of course in the special use where the term in brackets is zero. It is obviously in the interest of stability to work with as low a value of $c$ as possible by using very sensitive means of detecting small deflections of the beam.

Since the beam is, for this discussion, considered at a position of minimum level sensitivity $\theta+\beta=0$ and VI $$\frac{dc}{d\theta} = -c^2\left[1+\frac{1}{\mathrm{mgr}}\frac{\partial^2 \tau}{\partial \theta^2}\right]$$

The second factor in the above equation is controlled by the proportioning of the dimensions of the instrument. It is important to notice that if $$\frac{\partial^2 \tau}{\partial \theta^2} = -\mathrm{mgr}$$

strict linearity exists for all values of the sensitivity ($c$) even very high values since $$\frac{dc}{d\theta} = 0$$

for all values of $c$.

In general it is impossible to keep the term $$\left[1+\frac{1}{\mathrm{mgr}}\frac{\partial^2 \tau}{\partial \theta^2}\right]$$

equal to zero for all values of $c$ and $\theta$. It is sufficient if this term, which can be designated as $\gamma$, is of the order of unity. The designer of any instrument of this type will thus strive for as small a value of $\gamma$ as possible.

Any desired type of optical system or other means for accurately ascertaining the position of the mass may be used with the gravity meter here shown, but this part of the gravity meter has not been illustrated because it is only an adjunct to, and not a part of, the present invention. Further, magnetic, electrostatic or other means may be used to place in a zero or base position before each reading, and the reading may be obtained by determination of the amount of force required to return the mass to zero or base position each time a determination is made. Still further, clamps may be provided for holding the mass in a base or fixed position while the device is being transported and means may be provided for maintaining the temperature of the meter constant as well as for holding it in a relatively level position and guarding it from vibration. All of these are details that are contemplated as likely to be applied to this gravity meter in use but are not essential to the present invention.

Once it has been adjusted, the device is extremely sensitive, maintains its calibration unusually well, is very simple to construct, very rugged, quite easy to transport and relatively insensitive to level.

Many other detailed features that may be added as refinements to the gravity meter illustrated will immediately be apparent to those skilled in the art and it is to be understood that the scope of this invention includes the principles of this invention regardless of whether or not these numerous additional features are incorporated.

I claim:

1. A gravity meter that comprises a mass supported jointly by a leaf spring directed upwardly at an acute angle to the horizontal and a coil spring at an obtuse angle to the leaf spring said springs exerting thrust toward the mass supported therebetween, the leaf spring forming a fulcrum about which the mass moves and the coil spring being positioned so as to obliquely oppose any downward movement of the mass and thus relieve the leaf spring of at least a part of the bending stress the mass would otherwise impart to it.

2. A gravity meter that comprises a mass supported jointly by a leaf spring and a coil spring, the leaf spring forming a fulcrum about which the mass moves and the coil spring being under compression and positioned so as to obliquely oppose any downward movement of the mass and thus relieve the leaf spring of at least a part of the bending stress the mass would otherwise impart to it, and means for adjusting the compression of said coil spring.

3. A gravity meter that comprises a mass structure, a leaf spring and a compression coil spring for jointly and resiliently supporting the mass structure, said leaf spring forming a fulcrum about which the mass moves and said compression coil spring being positioned so as to exert a thrust on the mass structure in a direction substantially perpendicular to the direction of motion of the center of gravity of the mass structure about its fulcrum.

4. A gravity meter that comprises a mass structure, a leaf spring disposed at an acute angle to the horizontal and a compression coil spring for jointly and resiliently supporting the mass structure, said leaf spring forming a fulcrum about which the mass moves and said compression coil spring being positioned so as to exert a thrust on the mass structure in a direction substantially perpendicular to the direction of motion of the center of gravity of the mass structure about its fulcrum.

5. A gravity meter that comprises a mass structure, a leaf spring disposed at an acute angle to the horizontal and a compression coil spring disposed at an obtuse angle to the leaf spring for jointly and resiliently supporting the mass structure, said leaf spring forming a fulcrum about which the mass moves and said compression coil spring being positioned so as to exert a thrust on the mass structure in a direction substantially perpendicular to the direction of motion of the center of gravity of the mass structure about its fulcrum.

DAYTON H. CLEWELL.